(12) United States Patent
Brasch

(10) Patent No.: US 7,925,580 B2
(45) Date of Patent: Apr. 12, 2011

(54) MORTGAGE LOAN PRODUCT

(76) Inventor: Warren Brasch, Franklin, MI (US)

( * ) Notice: Subject to any disclaimer, the term of this patent is extended or adjusted under 35 U.S.C. 154(b) by 0 days.

(21) Appl. No.: 11/757,755

(22) Filed: Jun. 4, 2007

(65) Prior Publication Data

US 2007/0282737 A1 Dec. 6, 2007

Related U.S. Application Data

(60) Provisional application No. 60/804,034, filed on Jun. 6, 2006, provisional application No. 60/823,786, filed on Aug. 29, 2006.

(51) Int. Cl.
G06Q 40/00 (2006.01)

(52) U.S. Cl. ......................................................... 705/38

(58) Field of Classification Search ............... 705/35–42
See application file for complete search history.

(56) References Cited

U.S. PATENT DOCUMENTS

| | | | | |
|---|---|---|---|---|
| 5,742,775 | A * | 4/1998 | King | 705/38 |
| 5,819,230 | A | 10/1998 | Christie et al. | |
| 6,901,384 | B2 * | 5/2005 | Lynch et al. | 705/38 |
| 7,089,503 | B1 * | 8/2006 | Bloomquist et al. | 715/780 |
| 7,219,070 | B2 * | 5/2007 | Antonello et al. | 705/14 |
| 7,395,239 | B1 * | 7/2008 | Riseman | 705/38 |
| 7,574,401 | B1 * | 8/2009 | Burns | 705/38 |
| 7,676,410 | B2 * | 3/2010 | Petralia | 705/35 |
| 7,698,206 | B2 * | 4/2010 | Mostowfi | 705/37 |
| 7,752,102 | B2 * | 7/2010 | Thomas | 705/35 |
| 7,756,789 | B2 * | 7/2010 | Welker et al. | 705/41 |
| 2002/0052836 | A1 * | 5/2002 | Galperin et al. | 705/38 |
| 2002/0059136 | A1 | 5/2002 | May | |
| 2002/0103750 | A1 | 8/2002 | Herzfeld | |
| 2002/0123949 | A1 * | 9/2002 | VanLeeuwen | 705/35 |
| 2003/0033241 | A1 | 2/2003 | Harari | |
| 2003/0033242 | A1 * | 2/2003 | Lynch et al. | 705/38 |
| 2003/0036996 | A1 * | 2/2003 | Lazerson | 705/38 |
| 2003/0110122 | A1 | 6/2003 | Nalebuff et al. | |
| 2003/0149656 | A1 | 8/2003 | Magruder et al. | |
| 2003/0149659 | A1 * | 8/2003 | Danaher et al. | 705/38 |
| 2004/0044616 | A1 * | 3/2004 | Salter | 705/38 |
| 2004/0064402 | A1 | 4/2004 | Dreyer et al. | |
| 2004/0254835 | A1 * | 12/2004 | Thomas et al. | 705/14 |
| 2005/0004860 | A1 * | 1/2005 | Pretell et al. | 705/38 |
| 2005/0108028 | A1 | 5/2005 | Arehart | |

(Continued)

OTHER PUBLICATIONS

"Mortgage Insurance", Hindman J. Michael. Independent Banker. Sauk Center: Jan. 1997, vol. 47, Iss. 1, p. 51 (1 pp.).*

Kalinoski, Glenn J, "Old Seattle providing 100% debt consolidation product", Origination News. New York: Sep. 1998. vol. 7, Iss. 13; p. 39, 1 pgs.*

Barton, Paul & Spilchuck, Barry, "Consolidation loan may help control debt monster", North Bay Nugget. North Bay, Ont: Apr. 27, 2002. p. B.7.*

(Continued)

*Primary Examiner* — Ella Colbert
*Assistant Examiner* — Mohammad Z Shaikh
(74) *Attorney, Agent, or Firm* — Dobrusin & Thennisch PC

(57) ABSTRACT

In the present invention, a system and method is provided for making insurance policies and products, consumer goods, property taxes, household obligations and credit card debt more affordable by paying for such items, (collectively known as goods and services) through residential mortgages, home equity lines of credit and any other residential liens, by amending the interest rates or the balances due or a combination of both the interest rate and the balance due on such mortgages. The interest rates and/or balances charged on the aforementioned secured loans will be increased sufficiently to collect enough money each month to pay participating homeowners' monthly payments for their homeowner's insurance or other debts and products they chose to include within their mortgages. Because interest paid on most mortgages is tax deductible, this invention has the potential to offer a significant financial benefit.

20 Claims, 1 Drawing Sheet

U.S. PATENT DOCUMENTS

| | | | |
|---|---|---|---|
| 2005/0171820 A1* | 8/2005 | Snyder | 705/4 |
| 2005/0177499 A1* | 8/2005 | Thomas | 705/40 |
| 2005/0177508 A1* | 8/2005 | Pembroke | 705/40 |
| 2005/0234789 A1* | 10/2005 | Czyzewski et al. | 705/35 |
| 2005/0246267 A1 | 11/2005 | Nichols | |
| 2006/0020532 A1 | 1/2006 | Combs | |
| 2006/0069640 A1* | 3/2006 | Fitzgerald et al. | 705/38 |
| 2006/0074794 A1* | 4/2006 | Nespola, Jr. | 705/38 |
| 2006/0080236 A1* | 4/2006 | Welker et al. | 705/40 |
| 2006/0080246 A1 | 4/2006 | Wyckoff | |
| 2006/0136330 A1* | 6/2006 | DeRoy et al. | 705/38 |
| 2006/0149663 A1* | 7/2006 | Nichols | 705/38 |
| 2006/0155639 A1* | 7/2006 | Lynch et al. | 705/38 |
| 2006/0184435 A1* | 8/2006 | Mostowfi | 705/35 |
| 2007/0118451 A1 | 5/2007 | Schneider | |
| 2007/0156552 A1* | 7/2007 | Manganiello | 705/35 |
| 2007/0203805 A1* | 8/2007 | Ruhe et al. | 705/27 |
| 2007/0265958 A1* | 11/2007 | Petralia | 705/38 |

OTHER PUBLICATIONS

Burns, Scott, "In credit, its the montly payment that matters to lender", San Antonio Express- News. San Antonio, Tex: May 10, 2004. p. 1E.*

Citrome, Michael, "Save on interest by cutting your creditors down to one", The Province. Vancouver, B.C.: Feb. 15, 2005. p. A.28.*

"MGIC Introduces new MI option that makes homeownership more affordable for consumers", PR Newswire. New York: Aug. 19, 2004. p. 1.*

"Free Foreclosure Prevention Hotline Saves Homes", Business Wire. New York: Apr. 23, 2007.*

Information from the Flagstar Bank Website http://flagstar.gosinglefile.com/benefits.htm;"Lender Paid Mortgage Insurance" and various materials and articles from this website (Accessed Sep. 21, 2007).

* cited by examiner

MORTGAGE LOAN PRODUCT

CLAIM OF BENEFIT OF FILING DATE

The present application claims the benefit of the filing date of U.S. Application Ser. Nos. 60/804,034, filed Jun. 6, 2006, and 60/823,786, filed Aug. 29, 2006, both hereby incorporated by reference.

FIELD OF THE INVENTION

The present invention relates to real estate financing, and more particularly to an improved system and method for consolidating debt or other financial obligations under a real estate financing contract.

BACKGROUND OF THE INVENTION

Currently, there is a practice in the United States mortgage industry allowing home-owning borrowers to avoid non-tax deductible mortgage guaranty insurance premium payments (commonly known as "PMI", or private mortgage insurance) by opting instead for lender paid mortgage insurance. Briefly, it works as follows: at the outset of a finance contract relationship, home-owning borrowers and/or homebuyers borrowing more than 80% of their home's value in one single mortgage typically must either pay for mortgage guaranty insurance or agree to pay a higher interest rate than they would otherwise agree to, essentially financing the cost of the mortgage guaranty insurance into their interest rate. The mortgage industry often calls this later method "lender paid mortgage insurance". Some within the mortgage industry call this product tax advantaged mortgage insurance. Many mortgagors prefer this alternative to traditional "PMI" as a tax strategy. Because interest paid on residential mortgages is tax deductible, an otherwise non-tax deductible mortgage insurance guaranty premium is converted into a tax-deductible premium by charging and collecting the premium within the interest paid on the mortgage. This is accomplished by increasing the interest rate on a mortgage beyond the rate otherwise available to the home-owning borrower. The extra interest paid (differential between what the home-owning borrower could obtain and the increased rate agreed to) is used to compensate the mortgage lender for the risk involved in making a mortgage that exceeds eighty percent of the appraised value. The extra interest charged and collected is used by the lender or servicer of the mortgage to pay for the risk of providing a mortgage in excess of eighty percent of the lesser of the purchase price or the appraised value. This technique results in the borrower having tax-deductible mortgage insurance.

In the present invention, a system and method is described for making premium payments for insurance products, payments for condominium association dues and cooperative fees, payments for the purchase or lease of consumer goods, payments on credit card debt and student loan debt, property tax payments, and other debt typically incurred by home-owning borrower's tax deductible by paying for such items through interest charged on residential mortgages. Payments on such obligations will be paid through a home-owning borrower's mortgage interest payments. One objective is to make the payments for these items tax deductible in a similar manner that lender paid mortgage guaranty insurance is tax deductible, but to afford greater flexibility and opportunity to participate than under the traditional systems. Another objective is to consolidate a home-owning borrowers' financial obligations making debt management easier. All references to "mortgages" throughout this application include by definition mortgages for home purchases, mortgages to refinance homes, home equity lines of credit, and any other debt secured by residential real estate, and particularly pursuant to which the real estate is placed at risk of foreclosure for default. "Real estate financing contract" contemplates not only mortgages, but notes associated therewith.

SUMMARY OF THE INVENTION

In one preferred approach, the present invention is directed to a real estate financing method, comprising the steps of: a) maintaining a real estate financing contract with a borrower, which contract is a loan for a principal amount, established at a first predetermined interest rate, and secured by a mortgage on residential real estate held by the borrower; b) receiving a request by the borrower (or its designated representative) to assume responsibility to pay a financial obligation incurred by the borrower; c) engaging in a transaction for providing funds for payment of the financial obligation of the borrower, by paying the financial obligation on behalf of the borrower, by advancing funds to the borrower directly, or a combination thereof; d) amending the contract during its term to account for the providing of the funds, and in direct response to the transaction of providing of the funds, to increase the interest rate to one or more interest rates different from the first predetermined interest rate, to increase the principal amount, or a combination thereof; e) receiving interest payments from the borrower pursuant to the amended contract. It is also contemplated that the practice of the present method will include complying with Internal Revenue Service reporting requirements for the interest payments received.

As will be seen, the present invention offers improved systems and methods for consolidating financial obligations during the term of a real estate financing contract, such as consumer obligations, in order to facilitate the making of payments for insurance policies, insurance products, condominium association dues and cooperative fees, consumer goods, property taxes, credit card debt, any combination thereof, or the like. It will be seen that the methods and systems herein provide a way to make the undertaking of such obligations more affordable, by allowing for payment of such obligations through payments on residential mortgages, home equity lines of credit and any other residential liens, by amending the interest rates or the balances due or a combination of both the interest rate and the balance of mortgages. The interest rates and/or balances charged on the aforementioned secured real estate loans, even though increased sufficiently to collect enough money each month to pay participating home-owning borrowers' monthly payments for their obligations, will reduce the number of transactions required by the borrower, while helping to assure payments to creditors of and vendors to the borrower. In addition, because interest paid on most mortgages is tax deductible, this invention may offer a potentially significant financial benefit to mortgages. The invention also helps to avoid the burden and inconvenience of undertaking a complete re-financing transaction, by which a borrower will need to re-qualify for a particular mortgage. It also helps to avoid the need to secure the real estate under multiple liens. That is, the invention contemplates its practice on a first loan (e.g., the primary mortgage), and can afford benefits without the need for a second loan (e.g., a home equity line of credit).

Also, among the potential benefits of using the invention are the possibility that a home-owning borrower user of the methods and/or system herein may be able to improve his, her or its credit ratings, particularly given that use of the methods could result in savings that can be used to pay down debt at a rate faster than would otherwise be possible. Also, using the methods herein has the potential to result in bills being paid on time thereby reducing potentially derogatory or harmful credit references.

DETAILED DESCRIPTION

Figure 1:
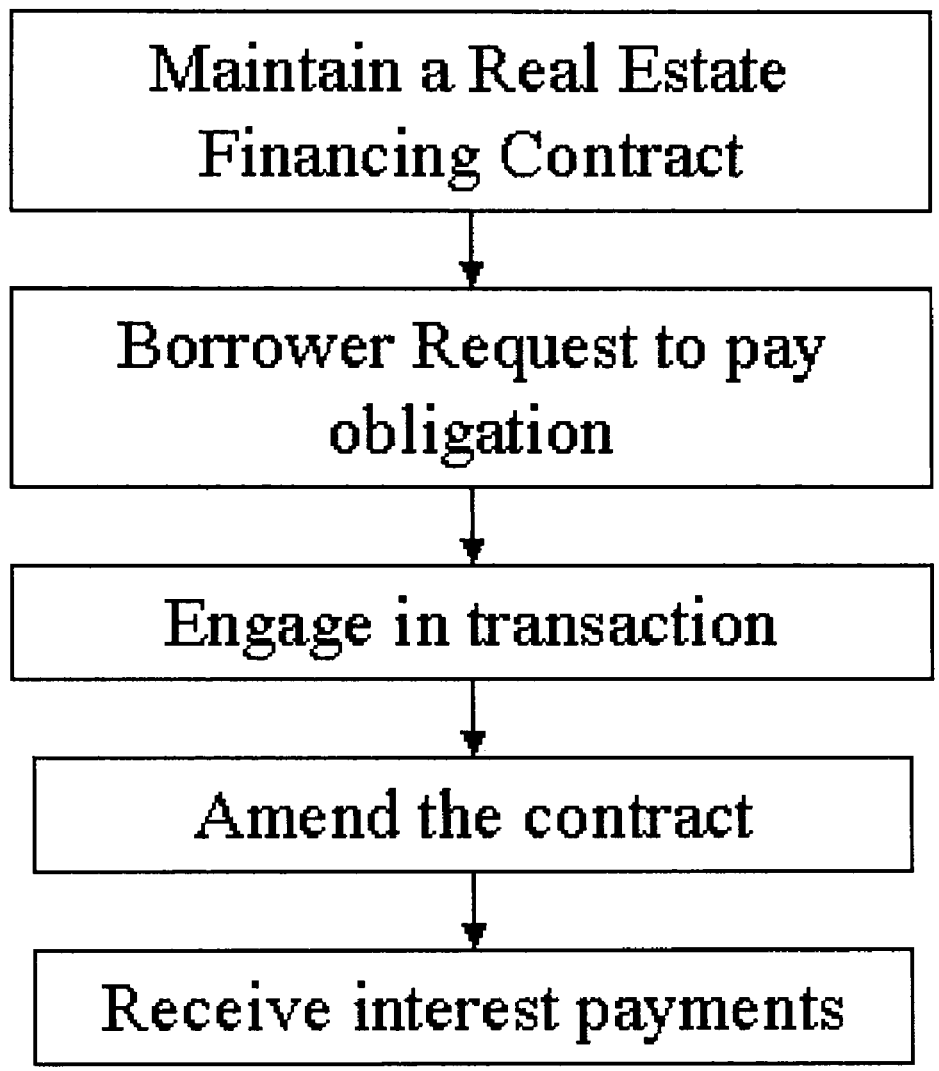
FIG. 1 is a flowchart illustrating one general preferred method according to the present invention.

In brief, as seen in FIG. 1, the teachings herein contemplate a real estate financing method, comprising the steps of: a) maintaining a real estate financing contract with a borrower (and particularly a home-owning borrower), which contract is a loan for a principal amount, established at a first predetermined interest rate, and secured by a mortgage on residential real estate held by the borrower; b) receiving a request by the borrower (or its designated representative) to assume responsibility to pay a financial obligation incurred by the borrower; c) engaging in a transaction for providing funds for payment of the financial obligation of the borrower, by paying the financial obligation on behalf of the borrower, by advancing funds to the borrower directly, or a combination thereof; d) temporarily or permanently amending the contract during its term to account for the providing of the funds, and in direct response to the transaction of providing of the funds, to increase the interest rate to one or more interest rates different from the first predetermined interest rate, to increase the principal amount, or a combination thereof; and e) receiving mortgage interest payments from the borrower pursuant to the amended contract. The teachings also contemplate complying with Internal Revenue Service reporting requirements for the mortgage interest payments received, and counseling borrowers to seek independent counsel to assure the propriety of tax deductions made on the basis of interest payments made herein.

The type of financial obligation herein may be selected from any of a variety of obligations. In one specific aspect the financial obligation is an obligation pursuant to which the borrower must pay an insurance premium for maintaining an insurance policy. The definition of "insurance" herein can include, but shall not be limited to, property and casualty (homeowner's insurance), motor vehicle insurance (including car, truck, and motor cycle insurance), marine insurance, health insurance including when desired optical and or dental insurance, disability insurance, flood insurance, whole and term life insurance and all other forms of insurance excluding private mortgage insurance and lender paid mortgage insurance. Thus, the financial obligation may include an obligation of the borrower to pay for a policy for (in addition to or other than private mortgage insurance and lender paid mortgage insurance) property and casualty insurance (e.g., homeowner's insurance), motor vehicle insurance (e.g., car, truck, and/or motor cycle insurance), marine insurance, health insurance (e.g., major medical, prescription drugs, optical and/or dental insurance), disability insurance, flood insurance, whole and/or term life insurance, other forms of insurance excluding private mortgage insurance and lender paid mortgage insurance, or any combination thereof.

The type of financial obligation is not limited to insurance, but may also involve contracts (e.g., one or more installment contracts or revolving credit contracts) for the purchase of goods or services. In one aspect, it is contemplated that the financial obligations may include obligations specifically related to home ownership, such as (without limitation), contracts for utility services, cable and/or satellite communications, landscaping, snow removal, fixtures, furnishings, appliances, cleaning, home repairs, capital improvements, maintenance, or any combination thereof. For this specific aspect, it is contemplated that periodically (e.g., annually), an itemized report document is or may be generated for the borrower by the lender or other administrator of the contract program, pursuant to which the borrower is apprised of the individual component costs and/or total cost of homeownership.

In another approach, the financial obligation is for the purpose of paying for legal services or other professional services in connection with creating and/or maintaining an estate plan. The obligation may call for payments to a trustee, an accountant, a lawyer, a banker or other fiduciary in accordance with such plan. In this regard, the methods may include a step of preparing for a borrower a document which might include a designation of the location of important estate planning documents, and contact information for facilitating the handling of affairs of the estate upon death of the borrower.

Of course, the financial obligation may relate to ordinary consumer purchases (e.g., automobiles, electronics, health club memberships, jewelry, etc.). The financial obligation may be for the purpose of paying a non-reimbursed medical expense, such as an expense for cosmetic surgery, vision correction, orthodontics or the like. The obligation may involve the purchase of services for childcare, assisted living care, transportation services, or otherwise. The financial obligations herein also contemplate existing secured or unsecured loans (e.g., credit card obligations, student loans, or otherwise). Tax (e.g., income and/or property) payments may also be included among the financial obligations. Any combination of the financial obligations taught herein may also be employed. Likewise, the method may include a step of generating a document such as an itemized listing of purchases for inventorying assets of the borrower.

As can be seen, it is thus also within the methods of the present teachings to include steps pursuant to which one or more independent entities provide goods or services for the borrower and enter into an agreement to be paid for the goods or services through proceeds paid pursuant to the real estate financing contract herein. For example, a doctor who performs an elective procedure for a patient not covered by health insurance may have a relationship by which he or she refers the patient to a provider of the real estate financing contracts herein, and the provider then enters into a real estate financing contract with the patient, so that the patient may ultimately realize a tax benefit from the cost of the procedure.

Administration of the contract may be employed in combination with administration of other programs for borrowers. For example, the lender may facilitate the participation of the home-owning borrower in an advantageous group benefits program to be paid for through proceeds from the real estate financing contract, (e.g., health insurance may be offered for participation in group rates and discounts for borrowers electing to enter into a real estate financing contract according to the methods herein, by which they would pay for such insurance through their mortgages).

Successful widespread use of the methods herein may be enhanced by establishing a network of goods or services providers. Such networks are expected at least in part to rely upon a system of referrals for bringing together borrowers in need of a good or service, and the providers of such goods or services. As can be appreciated, therefore, the methods herein may include a step of accepting a referral of the borrower by a third person with which the borrower has his or her financial obligation. Such a step may include a lender paying a fee to the third person or accepting a fee from the third person. The methods herein thus further include charging fees to providers of mortgages, mortgagees, mortgage bankers, mortgage brokers, mortgage lenders, mortgage originators, banks, insurance underwriters, insurance agents, insurance brokers, insurance companies, home equity lenders and fixed rate second, third or other junior lien lenders bankers, or brokers who offer homeowners, homebuyers, and mortgagors the opportunity to pay for insurance policies and products (excluding lender paid mortgage insurance and private mortgage insurance) by offering them interest rate amendments, modifications, charges or fees or balance amendments that permit homeowners to pay for insurance policies and products (excluding lender paid mortgage insurance) through payments made on mortgages and other liens on real estate.

It is therefore to be appreciated that the present teachings contemplate a method and system of paying for financial obligations other than those normally attendant with a primary real estate loan and mortgage transaction (e.g., private mortgage insurance and lender paid mortgage insurance) by charging and collecting interest on both fixed and adjustable rate mortgages (whether interest only or not) and all other liens on residential real estate to the extent needed to pay for such obligations. The methods and systems may include charging an increased interest rate on both fixed and adjustable mortgages and other residential liens above and beyond that which borrowers would otherwise agree to (or in the case of existing mortgages have agreed to) to pay the financial obligations (e.g., to pay for premiums or other charges due on insurance policies and products).

One feature of the invention is that it allows home-owning borrowers flexibility in accessing funds for transactions, which under current traditional financing practices would ordinarily occasion the home-owing borrower to re-finance under a new finance contract obligation (e.g., one by which further a re-qualification process would become necessary, new loan documents would need to be prepared, documents would need to be recorded, the real estate appraised, and the like). The methods of the present invention avoid some or all of these by allowing the initial real estate financing contract to be amended during its term. Thus, under one approach herein, the methods contemplate a step of amending the contract during the term of the contract, without the need to re-qualify the borrower, appraise the value of the real estate securing payment or both. It is thus possible that the real estate financing contract will be established at its origination to address existing financial obligations and allow for future obligations. In such instance, or at any time during a contract, it may be possible (in lieu of or in addition to an increased interest rate and/or increased principal balance) to charge the borrower a single fee (e.g., a specific origination fee).

The present teachings also contemplate an adjustment to the borrower's account upon cancellation or termination of the financial obligation (e.g., upon conclusion of the borrower's period of obligations to pay for private mortgage insurance). For instance, the borrower may then return his or her account balance or interest rate to a predetermined amount.

Though generally the real estate financing transactions contemplated herein will be first mortgages on a borrower's primary residence, they need not be. Other financing transactions are also within the scope, such as encumbrances on properties that are junior liens to first mortgages, such as home equity loans and fixed rate second and third mortgages.

Interest herein may be charged and collected on a monthly basis or other calendar based system. Optionally interest and charges may be held by the lender and used by the lender as needed to pay the obligation on behalf of the borrower. The transactions herein may involve transferring balances owed from one transaction to another, or to entire refinancing of existing financing contracts.

The invention herein has various ancillary capabilities, such as an instrumentality for pursuing an investment portfolio. For example, in another aspect of the invention, it is contemplated that the lender, borrower or both may deposit certain funds from the lender into an investment vehicle during the term of the contract (e.g., selected from one or more of investment accounts, stock brokerage and mutual fund accounts, money market accounts, certificates of deposits, savings accounts, checking accounts, or retirement accounts). Money from the account can be withdrawn by the lender to as needed to assure payment of the financial obligation undertaken. Also, some or all of the interest or gains realized from the investment vehicle may be shared as between the lender and the borrower, or given entirely to one of them.

The present invention also contemplates the establishment and use of a data processing system and associated hardware and software for administering or otherwise performing the steps of the present invention. In general, the data processing system will include a central processing unit, a communications interface for transferring information to and from other data processing systems, one or more user interfaces (which may be located at a number of remote sites (such as a borrower residence, a loan origination site such as a bank, real estate finance center, a real estate sales office or the like). Communications may be over a secure network, e.g., a secure Internet site. One or more databases associated with the data processing system may be employed for compiling or storing data pertaining to a transaction. The data processing system may also be suitably configured for generating loan origination and/or closing documents. The present invention also contemplates the service and maintenance of mortgage accounts using the data processing system. For example, mortgage payments for mortgages contemplated within the present teachings may be made electronically using the data processing system. Borrowers using the data processing system may be assigned a unique identifier (e.g., an alphanumeric identifier, a bar code, a radiofrequency identification signal, or the like), which the borrower may use to access information about the account.

As indicated, another aspect of the present invention pertains to document generation, such as the generation of reports, statements or both generated for the benefit of the borrower, and specifically in a suitable manner for facilitating the borrower's finances management. The reports, statements or both may be in electronic format, paper format or in another medium. In one aspect, it is contemplated that an electronic transmission of data, containing relevant tax information, can be transmitted using the data processing system (e.g., via the internet). It is also envisioned that the information may be provided in a format pursuant to which it is able to interface directly with available tax preparation software (e.g., TURBOTAX by Intuit, IRS FREE FILE, or a like product that can be used by a borrower or his or his designated tax preparation representative). In this manner, the data transmitted can be incorporated directly into a form for preparing a tax return, thereby avoiding the potential for operator error in the input of such information during the tax preparation process.

By way of example, the documents may be suitable statements that could include account balances and payment information for each participating account. The statements may offer a consolidated summary showing total monthly payment due based upon all included debts, a detailed summary showing each individual debt's monthly payment, history, and balance, and a summary of the monthly and year to date savings achieved by participating in the invention. The statements may include application information to include additional debts within the invention as well as offer participants instructions on how to remove accounts from participation in the invention. The instructions may allow for telephonic, written, faxed, Internet generated (including e-mailed and web-site based formats) platforms for making such changes. The statements may also offer opportunities to invest money saved by employing the method of the invention, into investment and savings accounts. The statements may further provide examples showing the gains achievable from investing the money saved by utilizing the invention, and the compounded growth opportunities available over multiple years and compare such gains to paying debts without the benefits of the invention.

As mentioned, such documents can help provide a convenient vehicle for a borrower to manage personal finances. For example, if a borrower elects to operate within the methods herein and secures a real estate financing contract to cover payments of various different personal expenses, each such expense can be itemized on a statement or report document, and the borrower can be afforded access to one or more tools for tracking his or her expenses, such as by category. This feature could be performed remotely. For example, a borrower can use the Internet to access account information and create or run report documents. One possible feature that may be included in statement or report documents a comparison of the amount of money saved (e.g., by way of tax benefits, reduced interest payments, or both) by the borrower using the methods herein as compared with not using the methods. Another feature might further include such comparison along with a projection of how much the cost savings would amount to if invested over time.

The present invention can be administered by any of a number of different entities. In one aspect, the entity is an entity that concentrates exclusively on mortgage transactions. In another, the entity is a financial services company (e.g., a bank), a financial planning company, or even an insurance company. Thus a party administering the methods herein in a transaction with a home-owning borrower might be a lender (e.g., a mortgage company, bank or the like) or a third party service provider.

It is appreciated that the obligation to provide private mortgage insurance may cease to exist after a certain amount of principal is paid. In one aspect of the present invention, it is contemplated that a product can be offered to a borrower by which the tax savings realized is segregated and periodically applied to the payment of principal. Thus, the tax benefit that may be obtainable by use of the present teachings may be directly employed for loan principal payment.

It will be appreciated that the methods herein can be executed such that the party administering a program under the method receives fees or pays fees for use of the method (e.g., a transaction fee, a fee based upon the total amount of money that is the subject of the loan, or otherwise). The fees can be a lump-sum fee, an installment fee or a combination thereof. It is possible that the fee will be collected from the borrower, any third person with whom the borrower has his or her financial obligation or each in order to use the method, or each of them.

The teachings of the present invention may be employed in combination with one or more other mortgage-related methods, including but not limited to any of those disclosed in U.S. Published Application Nos. 20030149656; 20040064402; 20010861126; 20020059136, 20030110122; 20020103750; 20030033241; 20060080246; 20050108028; 20050246267, or U.S. Pat. No. 5,819,230, all of which are hereby expressly incorporated by reference.

Because the methods herein allow home-owning borrowers relatively easy access to funds for making purchases, the methods are particularly attractive and lend well to the cross promotion of goods or services of third party vendors of goods or services. The methods thus contemplate the possible additional step of cross-promoting the method with promotion of goods, services or both, offered by a third person. To illustrate, an insurance company, a consumer goods company, a utilities company, a law firm, a consulting firm, an accounting firm, or any other third person provider of goods or services, may (alone or in cooperation with the person administering the methods herein) create a program and enroll a borrower to use the method via the third person. Thus, for example, upon the purchase of an item (e.g., a car from a car dealer), the borrower will be presented with all necessary paperwork (e.g., tangible papers, electronic forms, or both) for permitting him or her to use the methods herein as a borrower. This could prove to be an attractive way to offer appliances, home entertainment equipment, communications services subscriptions, telephones, computing devices, mortgages or any combination thereof.

Another aspect of the methods herein contemplates a step of administering an incentives program that rewards the borrower with benefits on the basis of borrower conduct. Without limitation, the incentive may be selected from reduced interest rates resulting in lower monthly mortgage payments, cash rebates, subscriptions, merchandise, gift certificates, travel discounts, coupons, computer downloadable information, waiver or discount of fees to use the method, or any combination thereof. The borrower conduct is selected from timely payment history, maintenance of a pre-determined credit rating, reduction of principal balance, elimination of debt for which the method is used to pay, or any combination thereof.

Without intending to be limited thereby, the following illustrations show how the methods taught herein may be practiced.

Homeowner's insurance premiums can be calculated annually or monthly. Upon knowing how much a homeowner's insurance policy will cost, a modification in the interest rate charged on a mortgage is made. The modification in the rate will be commensurate with collecting enough money to cover the cost of the insurance policy. By way of illustration, assuming a homeowners policy cost $1000, per year, that amount is the equivalent to $83.33, monthly. If the home-owning borrower has a $100,000 mortgage balance at a 6% interest rate, then he/she is paying approximately $600, per month. In order to address the obligation to account for the additional payment of the insurance, the interest rate may be modified to a higher rate, by amending the real estate financing contract during the term of the contract, to a rate such as 7.257%, for example. The difference between charging and collecting interest at 7.257% rather than 6% will give the mortgage servicer an extra $83.33, per month to pay the $83.33 owed for the borrower's insurance policy. The borrower will no longer pay directly for borrower's insurance. The mortgage interest rate can be modified each month based upon the principle owed or at other regular intervals. Refunds in the event of overpayments will be calculated at regular intervals. Overpayments can be applied toward outstanding balances or refunded. In the event of underpayments, balances can be modified to reflect under collection of amounts needed.

Every time the mortgage balance changes or the amount owed on the insurance, credit card, or other product changes the mortgage interest charged and collected may be recalculated and/or adjustments can be made to mortgage balances. Every time a mortgagor wants to modify the items paid for within the mortgage, the mortgage interest rate charged and collected will change so as to collect the correct amounts.

By way of further illustration, suppose a borrower has a real estate financing loan for a principal amount of $100,000, mortgage at 6%, for term of 360 months. The monthly principal and interest is about $600. Suppose the borrower wants to include homeowner insurance within mortgage payment, and the insurance costs about $700, per year. According to the method herein an additional $60, per month is collected from the borrower to pay to insurance company (this amount may be in addition to or may already include a fee allocable to a borrower enrollment fee). The real estate financing contract is thus amended to make the interest rate about 6.9%. The home-owning borrower will then pay $60, to the administrator of the present method (e.g., a mortgage lender) and the administrator will forward the $60, to the insurance company.

In the next illustration, the same facts as the previous illustration are used, except that the borrower only pays $600, of the $660, monthly requirement. The administrator, at its discretion (pursuant to covenants in the real estate financing contract) may elect to pay some or none of the third party obligation of the borrower. For instance, the mortgage lender may keep the full $600, and the insurance goes unpaid. Alternatively, the mortgage lender will pay the insurance to protect its collateral then begin its normal default/foreclosure process.

In another illustration, the real estate finance contract is an adjustable rate contract, and is for a principal amount of $300,000, with a starting interest rate of 6.375%, fixed for three years, and an initial monthly payment of about $1870. The borrower wants to include a $600, per month car payment within the mortgage payment. The car is financed on a 5-year lease. During the first three years of the mortgage the interest rate will be modified to, for example, 9.2665% to collect a total of about $2,470, of which the $600, is disbursed to the car finance company. If the home-owning borrower keeps the financing contract into the fourth year and the mortgage interest rate adjusts, then a new interest rate modification will be calculated to charge enough to cover both the house portion and the car portion of the payment. If the home-owning borrower sells the house at the end of three years and pays off the mortgage, the car payments can either be paid as part of a new mortgage or paid directly by the obligor to the car finance company.

In yet another illustration, the real estate finance contract is for a principal amount of $500,000, and is at a fixed rate of 6.6% for 30, years, with a monthly payment of about $3200. The Borrower has a consumer credit card with a balance of $15,000 and a monthly minimum payment of $1,125. To include the credit card payment within the real estate finance contract an amended interest rate of about 10% will be charged on the mortgage to collect enough to pay both the mortgage and credit card payment. A new monthly payment of about $4200, will be charged to the Borrower. If the credit card balance and monthly payments change, a new interest rate will be calculated.

For the above illustrations, as with the teachings in general herein, it is contemplated that the administrator will report interest payments periodically (e.g., in a written and/or electronic report to the borrower), which report will be part of a document that typically will include an indication of payment amounts, and will include the original interest paid from the original real estate financing contract, and the interest paid pursuant to the amended interest rate. It is possible that included within any such report or supplementing the report will be a comparison table or chart to show the borrower how the current interest rate at which the borrower's loan stands compares with other interest rates (e.g., prevailing mortgage rates, the prime rate, or the like), or other financial benchmarks (e.g., treasury notes, certain bonds, etc.). In this manner, the borrower is also more fully informed about his or her economic opportunity costs or other factors affecting the borrower's finance management.

It is also possible for the methods herein, including those featured in the above illustrations to practice the method to include one or more steps by which such that the total resulting obligation of the borrower is less than the total of the individual obligations. For example, in a cross-promotional scenario, if the monthly payment under the original real estate financing contract is $1500, and the contract is amended to address an additional monthly obligation of $500, (e.g., for purchased consumer goods), the amended interest rate (before considering any tax benefits) may be less than the total of $2000. Thus, the administrator/lender and the cross-promoting entity could offer to consumers the ability to convert total separate obligations into a single consolidated obligation that is less than the total of the separate obligations.

Determination of the interest rates herein pursuant to any amendments to the real estate financing contracts may be made according to a predetermined formula, it may be determined with regard to an economic indicator index, an established interest rate (e.g., prime rate), according to treasury note rates or the like. Interest rates may be agreed to in the real estate finance contract to fall within a certain range, within which the lender or administrator of the methods herein may have discretion to select depending upon one or more factors, such as borrower's credit rating, borrower's payment history, the amounts being advanced, complications in the reporting of the transaction, prevailing market rates, or any combination thereof.

In another aspect of the invention, it is contemplated that the methods may employ one or more steps that elicit competitive bids from vendors of products or services. That is, it is possible that a borrower may seek to amend a real estate financing contract according to the methods herein to purchase a particular good or service. The methods here could provide that a plurality of vendors of such goods or services would compete for the business of the borrower. For example, a borrower might complete a survey or otherwise provide a detailed specification of the good or service sought to be purchased (e.g., via a website of the internet). The specification would be made available for a plurality of vendors to provide quotations to the borrower. Based upon the quotations, the borrower would select a vendor, and consummate the transaction. As part of the consummation of the transaction, the borrower would employ the basic steps of the methods herein, such as by amending the contract to enable payment for the goods or services purchased. One specific embodiment would envision implementing a competitive bidding process for insurance products, pursuant to which the borrower is able to select from various vendors of insurance products, and select the insurer based upon criteria established by the borrower. An automated, competitive bidding process thus could help borrowers save both time and money when shopping for products or services and provide a mechanism to improve competition among vendors.

As part of such a competitive bidding process, or to otherwise participate as a vendor to which the borrower is introduced by a lender or administrator of the methods herein, it is contemplated a step of charging a fee for participation. That is, participating insurance or other eligible products or services providers may be charged a fee for having access to the borrowers (e.g., via a website) and for being permitted to compete for the home-owning borrowers' business.

Another possible step that may be employed in the methods of the present invention is a step by which lenders or other administrators of systems or methods herein compile feedback or survey information from the borrowers and make it available to other borrowers, potential borrowers, the goods or services provider or any combination thereof. For example, any website or other publication means maintained by the lender or administrator could include a module adapted for granting access to other potential borrowers about a participating goods or services provider. The site may thus include a rating system where home-owning borrowers may rate the level of service they received from the participating providers. The site may also include each provider's rating from corporate rating agencies. Borrowers can review quotes by looking at the web-site where the competitive bids are submitted, by e-mail, by mail, phone or other conventional means and select an appropriate provider company based upon items such as costs, payment, deductible (e.g. for insurance), reputation and the rating of each provider company.

In the course of performing the steps of the methods herein, it is contemplated that initial payment of insurance premiums at inception of mortgage may be consistent with the current practice used for funding mortgage escrow accounts at time of closings. Thus, for example, for purchase transactions a full year of the payments may be pre-paid prior to closing by the borrower directly to the provider. Additionally, a portion (e.g., about $2/12^{th}$, or $3/12^{th}$) of the yearly payment may be collected from borrowers at closing, deposited into an escrow account and used toward any payments due the following year. Other schedules of collecting money to pay insurance premiums or purchase transactions may also be developed. For refinance transactions the customary practice of funding escrow accounts at time of closing may continue. Costs of program participation may be charged and collected when the mortgages are closed. Renewal fees, if any, may be billed separately or included in the interest rate modifications.

As indicated elsewhere, the methods herein also envision steps of issuing annual or other periodic statements or other documents to borrowers showing how much interest was paid during the preceding year or period. The statement may show the interest paid including the insurance and excluding it. The statements may be as basic as a modification of the current 1099, form sent by lenders or their servicing partners to account for the interest payments resulting from any amendments to the real estate financing contract. The modified 1099, may state both interest paid on the principal loan balance and interest paid on purchase transactions. Interest Modification Statements may be issued when needed. Such statements or other documents could show calculations used to determine the amount of interest projected to be charged for some future period (e.g., the next twelve months). The modified interest rate will be a function of the base interest rate charged on the loan balance and interest charged to pay for purchase transactions. Such modifications may be needed when the cost of the insurance changes, or when the value of the purchase transactions change (e.g. new items purchased, old items paid off, etc . . . ). When mortgage balances are paid off home-owning borrowers will receive notices telling them they should continue to pay their payments directly to their product and service providers or their loans or policies will lapse.

Yet another possible aspect of the invention is an optional step of one or more of the participating vendors offering the borrowers who enroll and practice the methods herein some form of an exclusive benefit (e.g., discounts, value-added services, or otherwise). For example, because of the increased likelihood of timely payments, and reduced risk of carrying the credit with the borrower, vendors such as cable and satellite television providers, telephone service providers, home improvement stores, credit card providers, providers of insurance products, providers of security systems etc may offer their products and services at discounted prices pursuant to such a step. Discounted fees and interest rates on mortgages may also be offered to induce participation in the invention.

Likewise, the methods herein may include one or more steps of offering (e.g., through a network user interface, website or other means), participating home-owning borrowers some form of subscription-type discount services (e.g., via coupon books, whether purchasable or complimentary) for discounts from vendors and service providers. The "coupons" may be targeted based upon demographics, using criteria such as address, home values, income, age of home, length of time of ownership and other known information about participating home-owning borrowers. In the course of practicing the methods herein it is thus possible that a step of compiling and analyzing such demographic information is employed.

Another possible step for use in the methods of the invention herein contemplates offering participating home-owning borrowers a credit vehicle (e.g., a credit card, such as a house branded credit card), insurance products, financial investment products, or any combination thereof. Any of these may be combined in with the underlying real estate financing contract such that a single statement document may be issued to the borrower, and a single consolidated payment made by the borrower, effectively thereby tying directly into their mortgage payments, balances, and consolidated monthly mortgage statements. Such offerings may be priced at discounts compared to other providers of similar products and services.

The present invention is directed to a method and system for amending, charging and collecting interest and/or amending charging and collecting balances on mortgages and other real estate secured loans in a manner that will enable home-owning borrowers to pay financial obligations through their mortgage payments. When home-owning borrowers arrange to pay for items such as homeowner's insurance and condominium association dues and cooperative fees through mortgage interest payments, their payments become tax deductible. Modifications in mortgage interest rates and/or balances owed will also be available to include the costs of other insurance products and policies, payments on credit cards and student loans, payment of property taxes, and payments on purchases and leases of products such as motor vehicles. Homeownership has the possibility to be easier as other costs of living may become more affordable.

As seen, the methods herein advantageously permit a relatively flexible and convenient financing agreement for a homeowner borrower seeking to borrow money through an existing real estate financing contract, particularly a financing contract pursuant to which the borrower's home is placed at risk of foreclosure in the event of default by the borrower. In one preferred aspect, the methods herein are performed free of a step of re-qualifying the borrower, appraising the value of the real estate, or both during the term of the contract and after the step of receiving the request. Additionally, the methods are employed to meet mortgage underwriting guidelines, as established from time to time by FANNIE MAE, FREDDIE MAC, FHA, VA, non-conforming mortgage investors, and the sub-prime mortgage market.

The teachings herein have widespread application for efficient and economical purchase of various goods, services, financial instruments, investment vehicles or other products, ranging from an improved method and system of paying for premiums due, paying for purchases, paying debt instruments, taxes and assessments, and/or paying into savings or investment accounts, such as but not limited to: insurance products, insurance policies (excluding private mortgage insurance and lender paid mortgage insurance), condominium association and cooperative dues, consumer goods, credit card debt, student loan debt, property taxes and other real estate assessments, encumbrances on properties that are junior liens to first mortgages (e.g. home equity loans and fixed rate second and third mortgages), depositing money into investment accounts, stock brokerage and mutual fund accounts, money market accounts, certificates of deposits, savings accounts, checking accounts, and retirement accounts, by charging and collecting interest on both fixed and adjustable rate mortgages and all other liens on residential real estate to the extent needed to pay for such products.

The teachings also facilitate the ability to allow persons to purchase items that traditionally have been acquired through normal consumer debt, but instead enabling these persons to benefit from the real estate interests owned by them, such as from the resulting charges and collection of interest on both fixed and adjustable rate mortgages and all other liens on residential real estate to the extent needed to pay for such goods and services or other charges due on these goods or services. Accordingly, the methods and systems contemplated in this invention, may further include charging an increased interest rate on both fixed and adjustable mortgages and other residential liens above and beyond that which mortgagors would otherwise agree to (or in the case of existing mortgages have agreed to) to pay premiums or other charges due on goods and services. Thus, another aspect of the invention contemplates the possibility of including one or more steps such as a step of: i) paying for goods and services by amending balances owed on new and existing mortgages to charge and collect for the payments due on goods and services; ii) paying for goods and services, by offering a combination of amending mortgage balances on mortgages, charging fees in the origination of mortgages, and amending interest rates on mortgages to the extent needed to pay for payments due on goods and services (excluding lender paid mortgage insurance and private mortgage insurance); or both i) and ii).

According to one approach, the methods and systems contemplated in this invention may further include a step of amending interest rates and or balances due on mortgages when goods and services are paid off, cancelled, or the consumer wants to cancel the arrangement of paying for goods and services through his or her mortgage so that the mortgage balances and or interest rates are reduced to their pre-adjustment balances and or rates.

The invention further may be employed for transferring balances owed on goods and services from lien to lien and from one property to others encompassing both refinancing of liens and or selling property and buying new property.

The methods and systems of this invention include charging and collecting interest on a monthly basis or other calendar based system then distributing the interest (or other money collected) as needed to pay for money owed on goods and services. Additionally, including charging fees to homeowning borrowers and or mortgagors who want to participate in the program by permitting them to pay for goods and services through adjustments to the interest, fees or balances on their mortgages.

The methods and systems of this invention, further include charging fees to providers of goods and services who offer homeowners, homebuyers, and mortgagors the opportunity to pay for goods and services by offering them interest rate amendments, modifications, charges or fees or balance amendments that permit homeowners to pay for goods and services through payments made on mortgages and other liens on real estate. Additionally, it is contemplated that there could be other fees charged to providers of goods and services (e.g. retail stores, vehicle sales/leasing companies, taxing authorities, insurance underwriters, insurance agents, insurance brokers, insurance companies, and all persons and/or entities offering to sell or broker insurance) who permit payment for their goods and services through payments made on mortgages and other liens on real estate.

The invention further contemplates including amending, pricing, originating, underwriting, modifying, selling, marketing, servicing, accounting and recording of mortgages and other real estate secured liens that includes amending the interest rates charged and/or balances due in amounts necessary to pay amounts owed on goods and services.

The invention further contemplates modifying the interest rates charged and/or balances due on mortgages and other real estate secured liens as often as needed to reflect changes in the status of the goods and services (e.g. balances owed, balances paid in full, returns of consumer goods, credit due, changes in coverage provided by insurance policies changes in condominium association and cooperatives fees, termination of insurance policies and products, and mortgagors desire to pay for insurance premiums and/or products and condominium association and cooperatives fees through channels other than their real estate loans).

As indicated in portions of the previous discussion, another aspect of the invention may include maintaining a network user interface or web site (e.g., a secure site that requires log in identification, personal password or other unique identifier information for permitting access). The network user interface or website may be maintained as a means for providing financial services to individuals, such as services directed to personalized wealth management, debt management, savings, financial planning or any combination thereof. The services provider may coordinate in combination with the network user interface or website, trained professionals or other personnel, who are equipped to answer user questions, provide advice or otherwise interface with a customer in real-time, after a period of time has elapsed, or both.

The network user interface or website will preferably permit a user to establish one or more accounts. The network user interface or website will also be adapted to afford access to the user to specific information about the accounts, such as balances, account histories, forecasts, or otherwise on all participating accounts (both debts and investment accounts), provide models of savings that may be achieved by using the invention, and may also provide mechanisms to initiate requests for payment amendments as taught within.

In one aspect, the network user interface or website is adapted to graphically display (e.g., through graphs, charts, spread sheets or other visual displays, the financial advantages of making specific amendments to a user's finances by employing the methods herein. The network user interface or website preferably will be adapted to supply a user with information about balances owed, payments due, length of time to pay off obligations based upon particular increases or decreases made in the monthly payments, and potential financial gains by paying debts through mortgage indebtedness.

Another feature or step that preferably will be employed in the methods herein (e.g., included as a tool on the network user interface or website) would involve providing amortization schedules for homeowning borrowers to estimate potential savings possible by varying payment amounts, payment schedules or both. Calendaring (or otherwise sending reminders) of electronic bill payments may be performed according to the methods (again, possibly through the network user interface or website), for helping to reduce the chance of late payments and late fees.

Yet another possible feature includes a step of providing a home-owning borrower with an investment vehicle in the course of practicing the methods herein. For example, through any network user interface or website (or by other means) participants may create savings plans, individual investment accounts, and participate in other investment opportunities such as buying stocks, bonds, certificates of deposits and money market investments, in which gains achieved from practicing the invention can be deposited for long term growth. One possible approach includes a step of applying gains from investments toward the payment of the obligations under the real estate financing contract, such as for reducing the outstanding balance under the contract. Any such web site, or other suitable means, could provide investment strategy models and opportunities charting potential long-term gains that may be earned by practicing the invention. Likewise, one or more internet links may be offered whereby participants may open investment and savings accounts through a preferred vendor. Through the web site, information and funds may be transferred to such vendors to facilitate using the savings from the invention to create long term savings and investment plans.

In the course of administering any such website, it is possible to include a step of providing access to account information of a particular home-owning borrower to authorized third parties. For example, secondary and perhaps limited access passwords may be available for participants to share selected data with their tax preparers, accountants, CPA's, financial advisors, lawyers, and others of choice.

In one aspect, the methods and system herein contemplate the sale of advertising or promotions on any network user interface or website by third party providers of goods and services, e.g., by providing participating vendors a venue for offering discounts, marketing, awards bonuses, coupons or other incentives to those who use the methods taught herein. Any such network user interface or website may also provide access for allowing users to access on-line presentations (in real-time or after a lapse of time).

The methods and systems herein also contemplate providing secure e-mail addresses and access to an electronic network (e.g., an intranet) may be offered to participants allowing creditors and debtors an easy flow of information. These e-mail addresses and web site will provide a unique communication hub offering homeowners access to their accounts and participating vendors. Information may be easily and remotely accessible to receive and track all participating vendor's bills. Requests to consolidate debts and remote communications to all creditors can be made through this exclusive e-mail system. Access to account histories and customer services inquiries may be available through theses systems. Also, special discounts, bonuses or other incentives can be offered through this e-mail system to encourage further use of the methods herein disclosed. Also, the e-mail system can be used for cross marketing of services and products, account balance alerts, delinquency notices, credit balance alerts, and a variety of similar communications.

Though the provision of a website herein contemplates the use of a network such as the Internet, it is not limited solely to the Internet. Other networks can be employed as well. Further, though it is anticipated that many users will access account information from a personal computer, the use of other devices for obtaining access are also possible, including for example, cell phones, personal digital assistant devices, or even free-standing kiosks (e.g., as part of an ATM machine). Thus, unless specifically excluded, references herein to the use of a web site also contemplates the ability to access and electronic information network from a user interface other than a web site.

The methods of the invention herein may be practiced at various times in a real estate financing transaction. For example, the ability to secure additional funds by amending the financing contract during its term to account for the providing of the funds, and in direct response to the transaction of providing of the funds, to increase the interest rate to one or more interest rates different from the first predetermined interest rate, to increase the principal amount, or a combination thereof may be offered to a potential user when they inquire about home mortgage loans. As part of a mortgage application a user may be offered an opportunity to apply to participate in such a program. A potential mortgagor may accept an offer to have their mortgage or other real estate secured loan enrolled as a participating mortgage. Literature may be given with mortgage applications describing the benefits of making their mortgage eligible to participate in the invention. The literature may also provide lists of participating vendors such as insurance companies and credit card providers. Examples of such literature include one or more of (i) a document (as with all reference to "documents" herein, the term is used broadly to encompass paper documents, electronic documents (which may include a link to a website) or otherwise) that describes the methods herein; (ii) a document that identifies participating vendors; (iii) a document that illustrates sample calculations to show the possible savings available; (iv) personal release, waiver, power of attorney and/or authorization documents to grant access to information about the borrower, to authorize an agent to act on behalf of the borrower, or both; (v) confirmation receipt documents to acknowledge enrollment; (vi) financial data statements; (vii) enrollment applications, or any combination thereof. Some or all of the above documents may be combined into a single document, or split into plural documents. Further some or all of the above documents may be incorporated into documents conventionally employed for servicing a mortgage or other loan, (e.g., incorporated into a mortgage or other loan application).

Participation in the invention may also be offered by insurers, credit card companies and creditors. Such companies may make applications to participate in the invention available at point of purchase and through their normal correspondence (such as monthly billing statements) with debtors. Applications may also be available through financial software such as tax preparation software, investing software, Internet web sites, banks, tax preparers, financial advisors, stockbrokers, lawyers or other professionals.

In the following discussion, illustrations are provided (without limitation) to demonstrate how aspects of the invention may be performed. In one illustration, it is supposed that an applicant is interested in learning about the "Improved Mortgage Loan Product". Among the forms that might be sent to the applicant, a form titled to reflect that it is a "Program Description/Explanation" may be provided (may be e-mailed, faxed, down loaded from web site, mailed etc.), with (or even before) mortgage application documents or mortgage estimates. The "Program Description/Explanation" may also include information about how to participate, possible enrollment and renewal costs (if any) of program participation. The "Program Description/Explanation" may also refer people to a website where additional information is provided such as copies of program disclosures, on-line enrollment procedures, an on-line calculator that will calculate the modified interest rate based upon program participation and e-mail addresses where program questions may be addressed. An example of one such description might include definitions of significant terms, an overview of the procedure for implementing the program, and other explanatory information, and be worded to address some or all of the following substantive informational components in Form 1:

Form 1

One of the most important features of homeownership is the tax deductibility of the interest paid on mortgages. The deduction of interest paid on mortgages is one reason that homeownership is more desirable than renting. The Improved Mortgage Product helps home-owning borrowers maximize their interest deductions by including the cost of homeowners insurance with home-owning borrowers' mortgage interest payments. This is accomplished by modifying your mortgage's interest rate by an amount sufficient to collect enough money during the course of the year to renew your insurance policy on its due date each year.

View our hypothetical examples depicting how program participation works and potential savings to be achieved by participating in the Improved Mortgage Loan Program. Each home-owning borrower will achieve different results from the example based upon his or her mortgage amount, interest rate and insurance costs. Should you agree to enroll in this program you will acknowledge and agree to a charge of an enrollment fee. Should you desire additional information about this unique program, or if you want to see how this Program can help you save by performing sample calculations using our calculator estimator, please visit www.improvedmortageloanproduct. Program questions may be e-mailed to improvedmortgageadministrator.com. To start realizing the benefits of this Program, please complete the application form and return it to your lender.

Additional detailed explanatory forms might be included. For example, for one embodiment, a detailed explanation might include a summary such as the following Form 2:

Form 2

Improved Mortgage Loan Product—How it Works

1. Point of Sale occurs when an inquiry for a mortgage/home equity loan is made. Marketing/advertising may be initiated by lenders (licensed to offer Improved Mortgage Product) to generate inquiries about applying for a mortgage that includes the Improved Mortgage Loan Product. Lenders may attract more business than their unlicensed competitors by offering the Improved Mortgage Loan Product in conjunction with their various mortgage products. Participating mortgage providers will solicit borrowers to obtain financing including the "Improved Mortgage Loan Product" by offering a potentially tax deductible method of paying their home owners insurance premiums (and other participating products or services).

2. If applicant is interested in learning about the "Improved Mortgage Loan Product" a written Program Description/Explanation will be provided (may be e-mailed, faxed, down loaded from web site, mailed etc.), with (or even before) mortgage application documents or mortgage estimates. The written Program Description/Explanation may also include information about how to participate, possible enrollment and renewal costs (if any) of program participation. It may also refer people to a website where additional information is provided such as copies of program disclosures, on-line enrollment procedures, an on-line calculator that will calculate the modified interest rate based upon program participation and e-mail addresses where program questions may be addressed. Also provided will be a List of Participating Vendors, a Program Hypothetical will provide a hypothetical example of the savings achieved by participating in the Improved Mortgage Loan Product and a Written Authorization to Share Personal Information with Mortgage Product Partners (such as insurance companies). If borrower wants to participate in "Improved Mortgage Loan Product" and returns signed and completed forms and authorizations, then information relevant to obtaining home owners insurance quotes or other eligible products or services is forwarded from Mortgage Lender or Program Administrator to participating insurance carriers, agents or brokers/producers to underwrite and quote the cost of coverage. If authorized by borrower, data needed to issue insurance quotes may be posted on a secure website enabling participating/licensed homeowners' insurance providers to post their quotes. This automated, competitive bidding process will help borrowers save both time and money when shopping for insurance. Participating insurance providers may be charged a fee for having access to the website and for being permitted to compete for homeowners' business. The site may also include a rating system where home-owning borrowers may rate the level of service they received from participating insurance providers. The site may also include each insurance provider's rating from corporate rating agencies. Borrowers can review quotes by looking at the web-site site where the competitive bids are submitted, by e-mail, by mail, phone or other conventional means and select an appropriate insurance company based upon premium, deductible, reputation and the rating of each insurance company.

a. Insurance providers will be provided with copies of "Written Authorization," copies of home appraisal or other home valuation documents and relevant information from each mortgage application such as the purchase price or value of the subject home, dollar amount of mortgage, lender's mortgagee clause and loan number, name and contact information for the borrowers/insured's.

b. Insurance providers will provide quotes using one or more than one of the methods noted above (or via communication methods to be added at a later date) to borrowers and/or Mortgage Provider or via Product Administrator.

3. The Borrower may pick his or her own insurance provider and will inform mortgage lender and insurance company of his/her choice of Insurance Provider. Insurer provides final details of selected coverage and cost of insurance to borrower and to mortgage lender.

4. An appropriate Acknowledgement of Participation in Improved Mortgage Product, shall be prepared by Improved Mortgage Loan Product Administer/CPU/web-site/ or other provider acknowledging borrower's desire to enroll in and participate in the Improved Mortgage Product.

5. Borrowers will be required to sign, date and return the Acknowledgment of Participation to Mortgage Provider and/or Product Administrator acknowledging their participation in the Alternative Mortgage Product.
   a. The Acknowledgment of Participation will be duplicated and included with mortgage closing documents to again confirm borrowers' decision to participate in the Improved Mortgage Loan Program.
6. Initial payment of insurance premiums at inception of mortgage may be consistent with the current practice used for funding mortgage escrow accounts at time of closings.
   pa. For purchase transactions a full year of the premium may be pre-paid prior to closing by the borrower directly to the insurer. Additionally, $2/12^{th}$'s or $3/12^{th}$'s of the yearly premium may be collected from borrowers at closing, deposited into an escrow account and used toward renewal of insurance the following year. Other schedules of collecting money to pay insurance premiums may also be developed to address specific needs.
   b. After the closing, all additional funds needed to renew the homeowners' insurance will be paid through the modifications to the interest charged and received when the monthly mortgage payments are made. The funds collected will be used to renew the insurance policies when the premiums become due.
   c. For refinance transactions the customary practice of funding escrow accounts at time of closing may continue. Thereafter, all additional funds needed to renew the homeowner's insurance will be paid through modifications to the interest charged and received when the monthly mortgage payments are made.
   d. Costs of program participation may be charged and collected when the mortgages are closed. Renewal fees, if any, may be billed separately or included in the interest rate modifications.
   e. As mortgage interest payments are made funds needed to renew insurance will accumulate until it is time to renew the policy by making the next years premium payment. The manner of renewing the policies will be the same on purchase mortgages and refinance transaction.
   f. Annual Statements will be issued showing how much interest was paid during the preceding year. The statement may show the interest paid including the insurance and excluding it. The statements may simply be a modification of the current 1099, form sent by lenders or their servicing partners. The modified 1099, may state both interest paid on the principal loan balance and interest paid on insurance.
7. Interest Modification Statements may be issued when needed. These statements likely will show calculations used to determine the amount of interest to be charged for the next twelve months. The modified interest rate will be a function of the base interest rate charged on the loan balance and interest charged to pay for insurance. Such modifications may be needed when the cost of the insurance changes.
8. When mortgage balances are paid off borrowers will receive notices telling them they should continue to pay their premiums directly to their insurers or their policies will lapse.

Also provided to a prospective home-owning borrower interested in using the methods and/or systems herein may be a "List of Participating Vendors", to include the names and information about those vendors who already participate in this program. It is contemplated that this list may be organized by a number of methods, such as, but not limited to, by product type, alphabetical, by industry group, or geographically.

A "Program Hypothetical Example" may be provided to illustrate for the applicant a hypothetical example of the savings achieved by participating in the Improved Mortgage Loan Product. In an illustrative example of the "Program Hypothetical Example" applicants or potential applicants could receive information such as in Form 3:

Form 3

"For example, if you obtain a $100,000.00, thirty year fixed mortgage at an interest rate of 6.5% your monthly principal and interest payment will be $632.07.

After making your first twelve payments your will have paid $6,467.07, in tax-deductible interest." Assuming you have a homeowner's insurance policy that costs $650, per year or $54.17, per month, your principal and interest payment will be $632.07, plus monthly insurance of $54.17,, for a total of $686.24. By participating in the present program your mortgage interest rate will be modified/amended by an increase of rate to an interest rate of 7.30985%. The monthly mortgage payment will be $686.24. You will need to consult with your tax advisor to assure that you qualify, and to determine the appropriate tax rate for you. However, after making the first twelve payments while participating in the Program $7,117.11, will have been paid in what is anticipated to be regarded as tax-deductible mortgage interest payments. Based upon this example your Program participation will create an extra $650.00, in tax-deductible payments for you. After ten years of program participation you will have $6,500, more in tax-deductible mortgage interest payments than if you had not participated in the Program.

Additionally, a "Written Authorization to Share Personal Information with Mortgage Product Partners" (e.g. insurance companies, retail stores, taxing authorities), and some "Enrolment Application" forms may be provided. It is contemplated that the above forms should contain the standard personal information that most lenders require (e.g. Name, Address, Income Level, Employment Status/information, Social Security Number, etc . . . ), albeit the personal information released to the "Mortgage Product Partners" should be kept to an absolute minimum. For example, one such authorization document might include provisions to the effect of Form 4:

Form 4

Please share only as much information (but not my social security number or bank account numbers) with the following insurance companies (listed as follows) so that they may issue quotes and compete for my homeowner's insurance policy. The insurance companies listed below will be provided with Applicant's name, address, contact information and home's value.

If a borrower wants to participate in "Improved Mortgage Loan Product" and returns a signed enrollment documentation, then information relevant to obtaining home owners insurance quotes or other eligible products or services may be forwarded from Mortgage Lender or Program Administrator to participating insurance carriers, agents or brokers/producers to underwrite and quote the cost of coverage. "Signing" is not limited to physically affixing a signature, but could be electronic in nature. Once authorized by a borrower, data needed to issue insurance quotes or other eligible products or services may be posted on a secure website enabling participating/licensed homeowners' eligible products or services providers to post their quotes, which is envisioned to be an automated bidding site.

An "Acknowledgement of Participation in Improved Mortgage Product", may be prepared by Improved Mortgage Loan Product Administer/CPU/web-site/or other provider acknowledging borrower's desire to enroll in and participate in the Improved Mortgage Product. An illustrative document might provide for signature by the borrower, date, identification of other potentially significant individuals (e.g., insurers, agents or otherwise), and include statements to acknowledge participation in the program, to address terms and conditions of the program and/or to acknowledge potential forfeiture consequences of failing comply with borrower's obligations. For example, one such document might include to such as Form 5:

Form 5

We/I, (the mortgagors and insureds) hereby agree to participate in the Improved Mortgage Product. I/we understand that the interest rate charged on my/our mortgage will be modified by an appropriate amount to include the cost and payment of my homeowner's insurance. If the cost of my homeowners insurance changes my mortgage interest rate will change by a commensurate amount. By participating in the Improved Mortgage Product I/we understand that rather than paying a separate and distinct amount of money for the cost of our home owners insurance, I/we will instead pay a modified interest rate on our mortgage and my/our mortgage servicing company will pay renewal premiums charged by our insurance company. I/we further understand that if our mortgage payments become delinquent the mortgage servicing company may not have adequate funds to pay the premiums that become due on our home owners insurance. In such an event the servicing company may chose to pay the premiums and exercise any or all its options under the default provisions of either or both the mortgage and the note (the mortgage documents). The base interest rate on my mortgage/note is XXX%. The modified interest rate on my mortgage/note is YYY%. I/we agree to pay a non-refundable enrollment fee to participate in the Improved Mortgage Loan Product of $xxx.xx which will be paid at the time of my mortgage closing.

The above detailed discussion is based upon the employment of a core combination of steps that envision maintaining a real estate financing contract with a borrower, (and particularly a home-owning borrower) which contract is a loan for a principal amount, established at a first predetermined interest rate, and secured by a mortgage on residential real estate held by the borrower; b) receiving a request by the borrower (or its designated representative) to assume responsibility to pay a financial obligation incurred by the borrower during the term of the financing contract; c)engaging in a transaction for providing funds for payment of the financial obligation of the borrower, by paying the financial obligation on behalf of the borrower, by advancing funds to the borrower directly, or a combination thereof; d) amending the contract during its term to account for the providing of the funds, and in direct response to the transaction of providing of the funds, to increase the interest rate to one or more interest rates different from the first predetermined interest rate, to increase the principal amount, or a combination thereof; and receiving interest payments from the borrower pursuant to the amended contract. As indicated the methods may be practiced by any of a number of entities, such as lenders, vendors of goods and/or services, or some other entity having the responsibility for performing the steps of the methods and interacting with the borrower.

The various potential additional steps that may be employed, as have been described herein, may be employed singly or in combination with each other, and in combination with some (and more preferably all) of the above-mentioned (in the preceding paragraph) core steps. For example, it is possible that some (and more preferably all) of the core steps from the immediate preceding paragraph may be employed in combination with one or any combination of steps described herein, such as those selected from:

a) providing a home-owning borrower with an investment vehicle in the course of practicing the methods herein;
b) providing a network user interface, an internet website, or other borrower-accessible network for performing some or all of the steps;
c) providing documents that include account information of the borrower;
d) providing a competitive bidding system for offering goods or services to the borrower;
e) granting authorized access to a borrower's account to third parties;
f) generating documents for the borrower to describe results obtained from the use of the methods;
g) providing informational and/or explanatory forms to the borrower about the methods and system described herein;
h) regularly providing current and potential mortgage product customers updated lists of participating providers and products as such lists changes;
i) regularly providing current mortgage product customers with information on new and updated services;
j) providing statements of interest paid and/or any possible mortgage product transactions (e.g. fees, points, etc.) that may have a tax effect to a borrower and/or a taxing authority (as required by law),
k) amending the contract during its term to account for any changes in the status of the items being serviced by the mortgage product (e.g. item paid-off, new item added, item deleted from the mortgage product, change in insurance carrier, etc.), or
l) any combination of the above.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A data processing system implemented method for consolidating debt or other financial obligations under an amended real estate financing contract, comprising the steps of:

a) maintaining a real estate financing contract with a borrower, with the data processing system, which contract is a loan for a principal amount, established at a first predetermined interest rate, and secured by a mortgage on residential real estate held by the borrower;

b) receiving a request by the borrower or its designated representative to assume responsibility to make payments on a new or pre-existing financial obligation, but other than a financial obligation incurred by the borrower on the real estate financing contract;

c) engaging in a transaction that combines an outstanding balance on a credit obligation extended for the purchase of the new or pre-existing financial obligation by adding required payments for the new or pre-existing financial obligation to payment obligations required by the real estate finance contract without engaging in a refinancing of the real estate financing contract;

d) amending the contract during its term creating the amended real estate financing contract, to account for the merging of payments, and in direct response to the transaction of merging financial obligations and balances, to proportionally increase the first predetermined interest rate to one or more interest rates different from the first such that a combined payment equals the sum of the uncombined payments; and e) receiving combined payments from the borrower pursuant to the amended real estate contract.

2. The method of claim 1, wherein the method is free of a step of re-qualifying the borrower, appraising the value of the real estate, or both during the term of the real estate financing contract and after the step of receiving the request.

3. The method of claim 1, wherein at least two of the steps a through e are consummated using a secure data processing network.

4. The method of claim 1, wherein the new or pre-existing financial obligation includes an obligation of the borrower to pay for one or more of the following:

property and casualty insurance, motor vehicle insurance, marine insurance, health insurance, disability insurance, flood insurance, whole and/or term fixed or variable life insurance, contracts for the purchase of goods or services, obligations specifically related to home ownership, contracts for utility services, cable and/or satellite communications, condominium dues and cooperative living arrangement fees, landscaping, snow removal, fixtures, furnishings, appliances, cleaning, home repairs, capital improvements, maintenance, for the purpose of paying for legal services or other professional services, child support, alimony, payment of law suits or settlement of law suits, obligations that relate to ordinary consumer purchases, financial obligation for the purpose of paying a non-reimbursed medical expense, the purchase of services for child care, assisted living care, transportation services, secured or unsecured loans, and tax payments.

5. The method of claim 1 further comprising a step of providing regular reports to the borrower to apprise the borrower of account information.

6. The method of claim 1 further comprising a step of accepting a referral of the borrower by a third person with whom the borrower has his or her financial obligation.

7. The method of claim 6, wherein the step of accepting the referral of the borrower by a third person with whom the borrower has his or her financial obligation includes paying a fee or accepting a fee.

8. The method of claim 1 further comprising collecting a fee from the borrower, any third person with whom the borrower has his or her financial obligation or each in order to use the method.

9. The method of claim 1 further comprising a step of cross-promoting the method with promotion of goods, services or both, offered by a third person, wherein the third person is an issuer or owner of credit obligations.

10. The method of claim 9, further comprising enrolling a borrower in a program to use the method via the third person.

11. The method of claim 9, wherein the third person is a retailer of appliances, home entertainment equipment, communications services subscriptions, telephones, computing devices, or any combination thereof.

12. The method of claim 1 further comprising a step of administering an incentives program that rewards the borrower with benefits on the basis of borrower conduct.

13. The method of claim 12, wherein the incentive is selected from reduced interest rates, cash rebates, subscriptions, merchandise, gift certificates, travel discounts, coupons, computer downloadable information, waiver or discount of fees to use the method, or any combination thereof.

14. The method of claim 12, wherein the borrower conduct is selected from timely payment history, maintenance of a pre-determined credit rating, reduction of principal balance, elimination of debt for which the method is used to pay, or any combination thereof.

15. The method of any of claims 1, wherein the step of receiving a request by the borrower occurs at least in part electronically over the internet, in person, by mail, by facsimile, telephonically, or any combination thereof.

16. The method of claim 15, wherein the amending step includes securing an amendment to the real estate financing contract signed by the borrower.

17. The method of claim 16, wherein the amending step includes securing an acknowledgement of the amendment by any third person with whom the borrower has his or her financial obligation.

18. The method of claim 17, wherein the step of amending the contract during its term to account for the providing of the credit obligation, and in direct response to the transaction of providing of the credit obligation, consists essentially of increasing the interest rate to one or more interest rates different from the first predetermined interest rate.

19. A data processing system implemented method for consolidating debt or other financial obligations under an amended real estate financing contract, comprising the steps of:

a) maintaining a real estate financing contract with a borrower, with the data processing system, which contract is a loan for a principal amount, established at a first predetermined interest rate, and secured by a mortgage on residential real estate held by the borrower;

b) providing informational and/or explanatory forms to the borrower about the methods and system described herein;

c) providing a network user interface, an internet website, or other borrower-accessible network for performing some or all of the steps;

d) receiving a request by the borrower or its designated representative to assume responsibility to make payments on a new or pre-existing financial obligation, but other than a financial obligation incurred by the borrower on the real estate financing contract;

e) providing documents that include account information of the borrower;

f) providing a competitive bidding system for offering goods, services, or credit to the borrower;

g) granting authorized access to a borrower's account to third parties;

h) engaging in a transaction for combining an outstanding balance on a credit extended for the purchase of the new or pre-existing financial obligation by adding required payments for the new or pre-existing financial obligation to payment obligations required by the real estate finance contract;
- i) amending the contract during its term, creating the amended real estate financing contract, with the data processing system, to account for the merging of payments, and in direct response to the transaction of merging financial obligations and balances, to proportionally increase the first predetermined interest rate to one or more interest rates different from the first such that a combined payment equals the sum of the uncombined payments;
- j) receiving the combined payments from the borrower pursuant to the amended contract and servicing the amended real estate financing contract by distributing the payments for the merged financial obligations and balances on a proportional basis; and
- k) complying with a taxing authority reporting requirements for the combined payments received.

20. A data processing system implemented method for consolidating debt or other financial obligations under an amended real estate financing contract, comprising the steps of:
- a) maintaining a real estate financing contract with a borrower, with the data processing system, which contract is a loan for a principal amount, established at a first predetermined interest rate, and secured by a mortgage on residential real estate held by the borrower;
- b) receiving a request by the borrower or its designated representative to assume responsibility to make payments on a new or pre-existing financial obligation, but other than a financial obligation incurred by the borrower on the real estate financing contract;
- c) engaging in a transaction for combining an outstanding balance on a credit extended for the purchase of the new or pre-existing financial obligation by adding required payments for the new or pre-existing financial obligation to payment obligations required by the real estate finance contract;
- d) amending the contract during its term, with the data processing system, creating the amended real estate financing contract, to account for the merging of payments, and in direct response to the transaction of merging financial obligations and balances, to proportionally increase the first predetermined interest rate to one or more interest rates different from the first such that a combined payment equals the sum of the uncombined payments;
- e) receiving the combined payments from the borrower pursuant to the amended contract;
- f) complying with a taxing authority reporting requirements for the combined payments received; and
- g) completing a step selected from:
  - a. providing a home-owning borrower with an investment vehicle in the course of practicing the methods herein;
  - b. providing a network user interface, an internet website, or other borrower-accessible network for performing some or all of the steps;
  - c. providing documents that include account information of the borrower;
  - d. providing a competitive bidding system for offering goods, services, or credit to the borrower;
  - e. granting authorized access to a borrower's account to third parties;
  - f. generating documents for the borrower to describe results obtained from the use of the methods;
  - g. providing informational and/or explanatory forms to the borrower about the methods and system described herein;
  - h. regularly providing current and potential mortgage product customers updated lists of participating providers and products as such lists changes;
  - i. regularly providing current mortgage product customers with information on new and updated services;
  - j. providing statements of interest paid and/or any possible mortgage product transactions that may have a tax effect to a borrower and/or a taxing authority,
  - k. amending the contract during its term to account for any changes in the status of the items being serviced by the mortgage product, or
  - l. any combination of the above.

* * * * *

UNITED STATES PATENT AND TRADEMARK OFFICE
CERTIFICATE OF CORRECTION

| | | |
|---|---|---|
| PATENT NO. | : 7,925,580 B2 | Page 1 of 1 |
| APPLICATION NO. | : 11/757755 | |
| DATED | : April 12, 2011 | |
| INVENTOR(S) | : Warren Brasch | |

It is certified that error appears in the above-identified patent and that said Letters Patent is hereby corrected as shown below:

In Col. 22, line 59, Claim 1, please delete "data processing ."

In Col. 23, line 36, Claim 4, please delete "and/"

In Col. 24, line 39, Claim 19, please delete "data processing."

In Col. 24, line 48, Claim 19, please delete "and/"

In Col 24, line 49, Claim 19, please delete "borrower ."

In Col. 25, line 3, Claim 19, please insert --without engaging.--

In Col. 25, line 20, Claim 20, please delete "data processing."

In Col. 25, line 39, Claim 20, please insert --without engaging in a refinancing of the real estate financing contract.--

In Col. 26, line 27, Claim 20, please delete "about the method and system described herein."

In Col. 26, line 34, Claim 20, please delete "and/"

In Col. 26, line 36, Claim 20, please delete "and/"

Signed and Sealed this
Fifth Day of July, 2011

David J. Kappos
*Director of the United States Patent and Trademark Office*